C. R. THOMPSON.
PLOW-COLTERS.

No. 191,622. Patented June 5, 1877.

WITNESSES:
Frances McArdle,
J. H. Scarborough.

INVENTOR:
C. R. Thompson
BY
ATTORNEYS.

UNITED STATES PATENT OFFICE.

CHARLES R. THOMPSON, OF LEBANON, KENTUCKY.

IMPROVEMENT IN PLOW-COLTERS.

Specification forming part of Letters Patent No. 191,622, dated June 5, 1877; application filed April 30, 1877.

*To all whom it may concern:*

Figure 1:
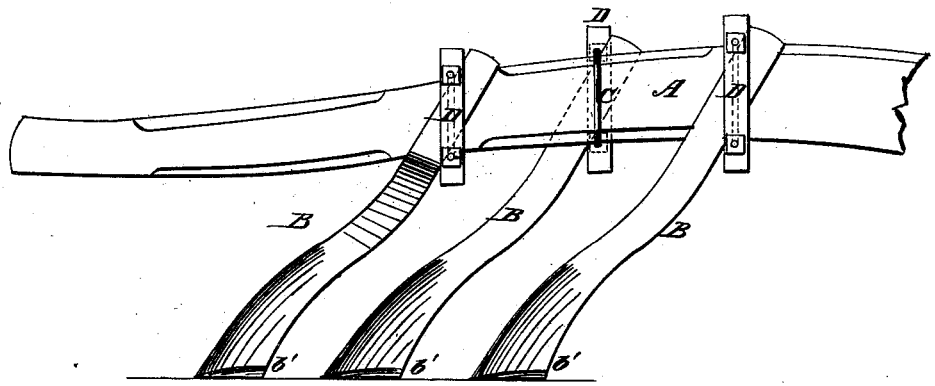
Figure 2:
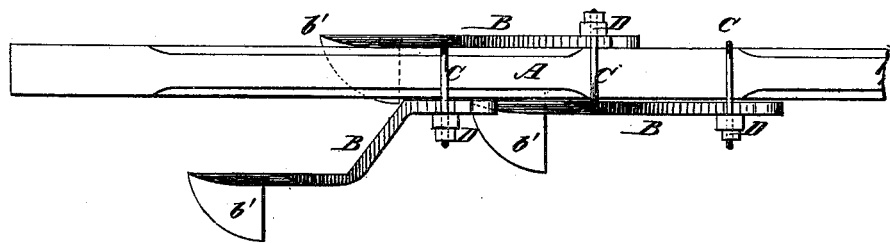

Be it known that I, CHARLES R. THOMPSON, of Lebanon, in the county of Marion and State of Kentucky, have invented a new and useful Improvement in Plow-Colters, of which the following is a specification:

Figure 1 is a side view of a plow-beam, to which three of my improved colters have been applied. Fig. 2 is a top view of the same.

Similar letters of reference indicate corresponding parts.

The object of this invention is to furnish colters which shall be so constructed as to cut the sod into narrow strips, separate it from the soil beneath it, and leave it in its place, so that it will be turned under with the furrow-slice.

The invention consists in the combination of two or more colters, provided with horizontal triangular cutters at their lower ends with the same beam, substantially as herein shown and described.

A represents a plow-beam, to which are secured the colters B. Two or more of the colters B are attached to the beam A, their upper parts, or some of their upper parts, being bent to bring their cutting parts to the proper distance apart. The upper ends of the colters B may be secured to the beam A by bows C and yokes D, or other convenient means. Upon the lower ends of the colters B are formed horizontal cutters $b'$, which are made in the general form of right-angle triangles, with their outer sides rounded off, as shown in Fig. 2, so as to separate the narrow strips of sod from the soil beneath them.

Two or more of the colters B may be used, as may be required. The colters B may be attached to the beam of the turn-plow, or they may be attached to a frame drawn in advance of said plow.

Having thus described my invention, I claim as new and desire to secure by Letters Patent—

The combination, with a plow, of two or more colters, B, provided with horizontal triangular cutters $b'$ at their lower ends, and with the same beam A, substantially as herein shown and described.

CHARLES R. THOMPSON.

Witnesses:
N. S. RAY,
J. H. THOMPSON.